United States Patent [19]

Stenner

[11] Patent Number: 4,600,366
[45] Date of Patent: Jul. 15, 1986

[54] FEED RATE CONTROL FOR PERISTALTIC PUMP

[76] Inventor: Gustav H. Stenner, 10708 Executive Dr., Jacksonville, Fla. 32225

[21] Appl. No.: 786,289

[22] Filed: Oct. 10, 1985

[51] Int. Cl.⁴ .................. F04B 9/00; F16H 27/06; F16H 27/10
[52] U.S. Cl. .................. 417/319; 417/477; 74/84 R; 74/125.5
[58] Field of Search ............ 417/319, 477; 74/84 R, 74/125.5

[56] References Cited
U.S. PATENT DOCUMENTS 2,219,040 10/1940 Harper .................. 74/125.5
2,334,148 11/1943 Jones .................. 417/477
4,189,286 2/1980 Murray .................. 417/477

Primary Examiner—William L. Freeh
Attorney, Agent, or Firm—Arthur G. Yeager

[57] ABSTRACT

Apparatus for adjustable control of the rate of pumping liquid through a peristaltic pump, comprising a main shaft onto which an index plate is slideably engaged and locked by rotating the plate with respect to the shaft and seating the plate in a lateral slot on the shaft, a pawl assembly rotated by a motor and adapted to engage and disengage itself to the index plate as the assembly follows an adjustable cam surface, thereby providing intermittent rotation to the shaft which drives a peristaltic pump.

12 Claims, 9 Drawing Figures

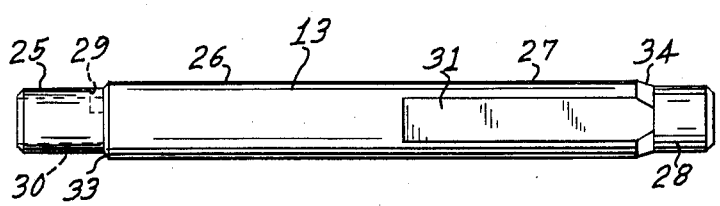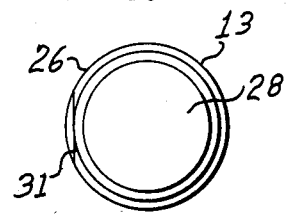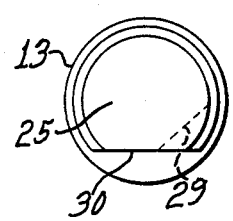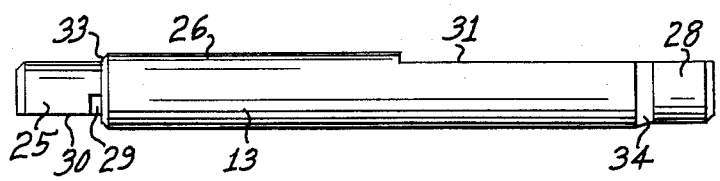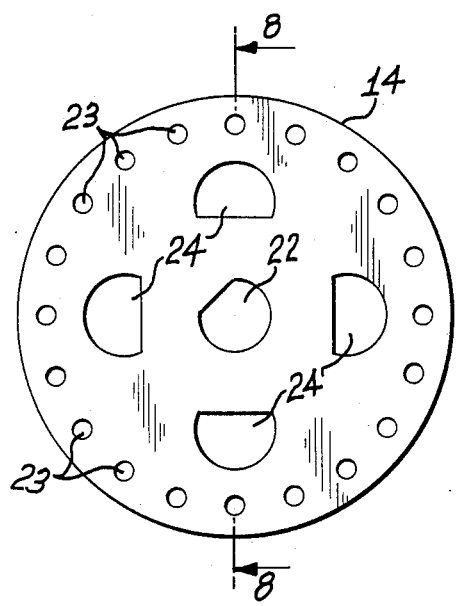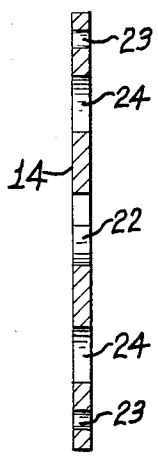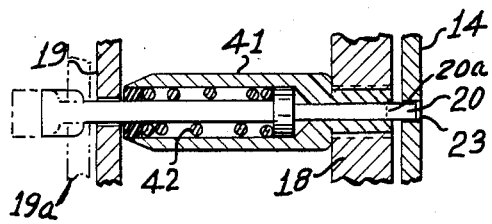

FEED RATE CONTROL FOR PERISTALTIC PUMP

BACKGROUND OF THE INVENTION

There are many instances where there is a need to introduce a small accurately measured amount of a liquid into a much larger volume of liquid. For example, swimming pools must be constantly treated with chlorine and pH adjusting materials in order to keep the water in the pool in proper condition. Other examples are found in the food, chemical, or pharmaceutical industry where catalysts, reactants, enzymes, modifiers, etc. must be added slowly and continuously to a larger composition. It is advantageous if such an additive can be introduced through a pump which can provide a positive pressure for injecting the additive under the surface of the larger volume of liquid. It also is advantageous if that pump can be readily adjusted to change the output rate.

A peristaltic pump is one which has several advantages in meeting the above requirements. A peristaltic pump contains a flexible tubular passage through which the pumped material passes. A plurality of spaced rollers are pressed against the tube and rolled toward the outlet end of the tube. This arrangement provides the positive pressure in expelling the liquid from the tube and it provides an accurate volume of liquid between successive rollers. Convenient means for making the output adjustable involves a variable cam drive which provides intermittent movement to the rollers. All of these features are found in my U.S. Pat. No. 3,756,752 and in the earlier patent to S. Kaufman, U.S. Pat. No. 2,975,719.

The improvement provided in my present invention is found in the facility in which the feed rate control component may be assembled or disassembled for repair or for replacement of parts. All too frequently it is not possible to repair a pump without special tools. This is a disadvantage when the pump is employed in a residential swimming pool, and the pool owner is not equipped with all the special tools and know-how to service the pump. Accordingly, it is an object of this invention to provide such an apparatus which can readily be assembled or disassembled without special tools. Still other objects will appear from the more detailed description which follows.

BRIEF DESCRIPTION OF THE INVENTION

This invention relates to a feed rate control apparatus for a peristaltic pump including a main shaft, an index plate mounted on the main shaft, a spring biased pawl adapted to intermittently engage and disengage one of a plurality of holes in said plate as a follower moves over a variable cam surface, the improvement which comprises said index plate having a central D-shaped hole for slideable engagement with an end portion of said main shaft having complemental D-shaped cross-section, said main shaft having a central portion of larger diameter than that of said end portion to form a shoulder at the junction of said end and central portions, said end portion at said shoulder having a slot substantially the width of said plate with its bottom surface at an angle of about 45° from the flat surface of said D-shaped cross-section of said end portion, the thickness of said main shaft measured along the diameter perpendicular to the flat side of said D-shaped cross-section being substantially equal to the thickness measured along the diameter perpendicular to the bottom surface of said slot.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a a top plan view of the main shaft.

FIG. 4 is a front elevational view of the main shaft.

FIG. 5 is an enlarged left end view of the main shaft of FIG. 4.

FIG. 6 is a right end view of the main shaft of FIG. 3.

FIG. 7 is a top plan view of the index plate.

FIG. 8 a cross-sectional view taken at 8—8 of FIG. 7.

FIG. 9 a cross-sectional view taken at 9—9 of FIG. 1.

DETAILED DESCRIPTION OF THE INVENTION

Figure 1:
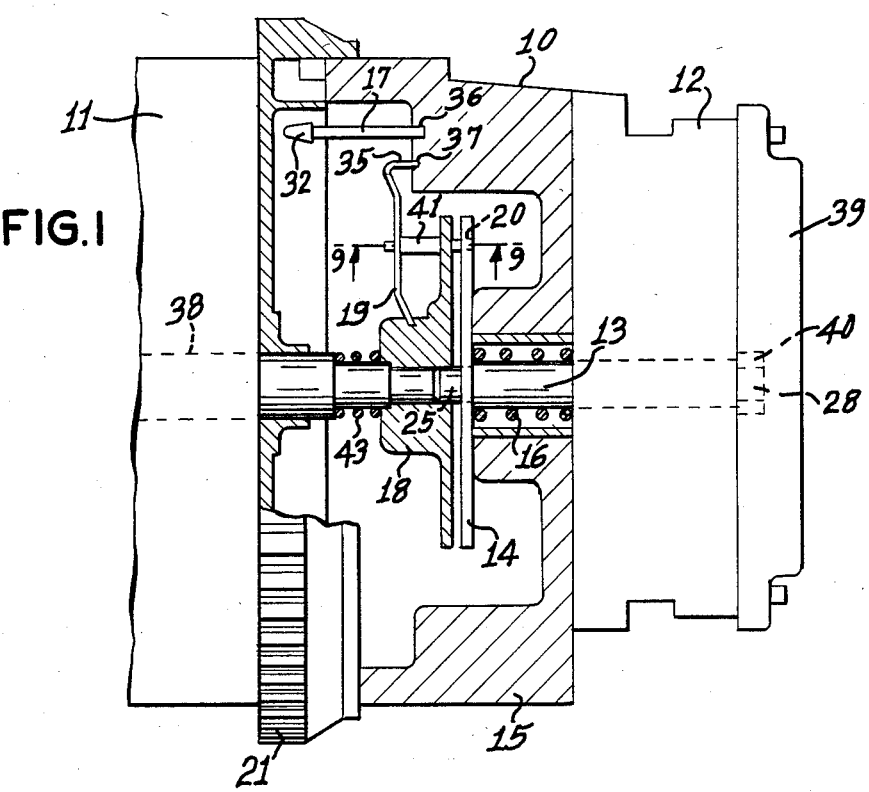
FIG. 1 is a cross-sectional view of the feed rate control apparatus of this invention.
Figure 2:
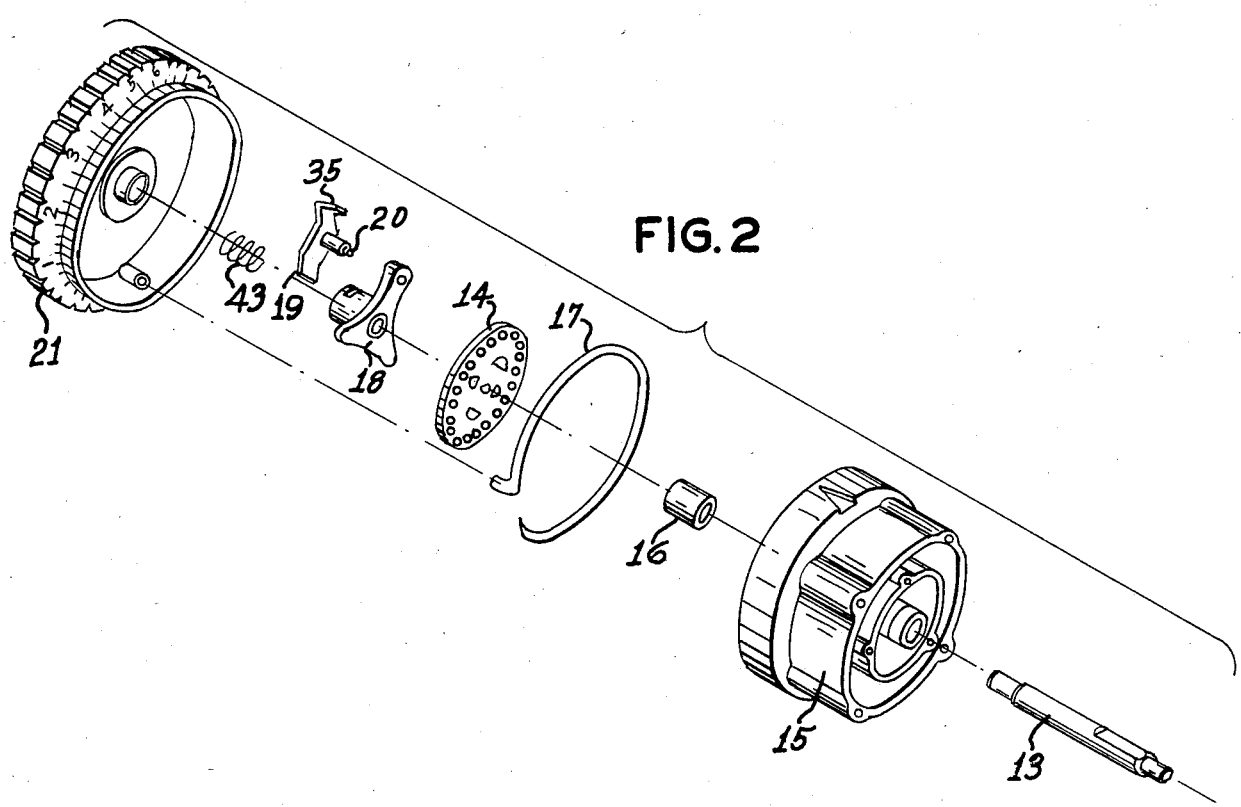
FIG. 2 is an exploded perspective view of the feed rate control apparatus of this invention.

In FIGS. 1-2 there is shown the feed rate control apparatus for a peristaltic pump. Feed rate control apparatus 10 is attached to the face of motor 11, and serves as a base for attachment of peristaltic pump 12. Cover 39 protects the moving parts of pump 12 from the environment, whether it be the atmosphere or the surrounding liquid in the case of a submerged mounting. Main shaft 13 serves as the mounting for feed rate control apparatus 10 and pump 12. Motor 11 has an output shaft 38 which is adapted to be coupled to the inboard end of main shaft 13 by any convenient means. The attachment here is shown to be by way of a pawl 20 which turns with motor shaft 38 and engages plate 14 which turns with main shaft 13.

Feed rate control apparatus 10 includes as its components main shaft 13, index plate 14, housing 15, roller clutch 16, flexible cable 17, spider 18, pawl holding arm 19, pawl 20 and dial ring 21. Not shown are various nuts, screws, washers, and seals used to secure the components together in operating relationship. The manner in which the various components function to provide an adjustable feed rate control for the output of pump 12 is adequately described in the aforementioned U.S. Pat. Nos. 2,975,719 and 3,756,752. In general, follower finger 35 contacts the surface of cable 17 in inner groove 37 being pressed against cable 17 by the action of spring 42 in pawl housing 41. Holding arm 19 attached to spider 18 biases pawl 20 toward index plate 14 to project into hole 23. Cable 17 is adjusted to be in a selected portion of inner groove 37 by turning dial ring 21 which is affixed to one end of cable 19 and moves cable from outer groove 36 into inner groove 37 or in the reverse direction. This leaves cable 17 filling only a selected portion of the length of inner groove 37. When follower finger 35 is riding on cable 17, pawl 20 is withdrawn away from index plate 14, and when finger 35 is allowed to project into the depth of groove 37 (where cable 17 is not present in groove 37) pawl 20 projects through spider 18 and catches one of a plurality of holes 23 in index plate 14, causing plate 14 to rotate with the rotation of spider 18. Thus plate 14 intermittently rotates and is stationary during each revolution of spider 18 which is driven by motor 11 through shaft 38. Spring 43 mounted on shaft 38 urges spider 18 toward index plate 14. When index plate 14 rotates, it causes main shaft 13 to rotate and also causes the components of peristaltic pump 12 to rotate and deliver liquid from its outlet port. The adjustment of dial ring 21 and, thereby, the positioning of flexible cable 17 in grooves 36 and 37 provides a range of pumping times from 0% to 100% of each revolution of motor shaft 38.

A particularly important feature of this invention is illustrated in FIGS. 3–8 showing how main shaft 13 is coupled and uncoupled to index plate 14. Main shaft 13 includes a first end portion 25, a first central portion 26, a second central portion 27, and a second end portion 28. First end portion 25 includes a seat for index plate 14 and extends beyond index plate 14 to partially support spider 18 attached to motor shaft 38. End portion 25 has a flat planar surface 30 extending lengthwise of end portion 25 to form a D-shaped cross-section over which the central D-shaped opening in plate 14 may slide. First shoulder 33 is at the junction of first end portion 25 and first central portion 26. At that location, adjacent shoulder 33 is a lateral slot 29 substantially as wide as the thickness of index plate 14. The bottom of slot 29 is a flat surface positioned at an angle of about 45° from that of flat surface 30. The distance along the diameter of end portion 25 which is perpendicular to flat surface 30 should be substantially the same as the distance along the diameter perpendicular to the bottom of slot 29. This configuration, as will be described in more detail below, permits index plate 14 to be slid over first end portion 25 to rest against shoulder 33 and be rotated 45° so as to be seated in slot 29 and will not slide axially off end portion 25. Motor shaft 38 and main shaft 13 are driven in a direction that tends to maintain plate 14 seated in slot 29.

First central portion 26 is an unmodified cylindrical portion of main shaft 13 and forms a seat for roller clutch 16 around which housing 15 is fastened. Roller clutch 16 permits free rotation of main shaft 13 in housing 15 in one direction but not in the other direction. The permitted direction is that which is encountered when pawl 20 engages index plate 14 causing pump 12 to deliver a shot of liquid. Reverse direction, which would cause the pump to suck water from the swimming pool, is prevented by roller clutch 16.

Second central portion 27 of main shaft 13 includes a flattened planar surface 31 extending lengthwise of that portion. Portion 27 is designed to couple pump 12 thereto so that rotation of shaft 13 causes the pumping action to occur.

Second end portion 28 of main shaft 13 is joined to second central portion by second shoulder 34. End portion 28 is an unmodified cylindrical portion and is adapted to fit into a bearing 40 supported by cover 39 (see FIG. 1).

Index plate 14 is a thin circular plate with a central D-shaped hole 22 and a plurality of small holes 23 arranged in a circle adjacent the outer perimeter of plate 14. D-shaped hole 22 is slightly larger than the D-shaped cross-section of first end portion 25 permitting plate 14 to be slid over main shaft 13 with end portion 25 passing through hole 22. First central portion 26 of main shaft 13 is sufficiently larger in diameter than D-shaped hole 22 that plate 14 is stopped by first shoulder 33. Plate 14 is rotated 45° in the direction corresponding to slot 29 which permits plate 14 to be locked into slot 29 so that it will remain against shoulder 33 until rotated in the reverse direction for removal from main shaft 13. Holes 23 are equally spaced about the perimeter and are of a size to receive pawl 20 in any one hole 23. It is desirable to employ the maximum number of holes 23, consistent with retaining the strength of the plate against breakage, so as to provide the finest adjustment in pumping times. Large openings 24 are for weight reduction and do not affect the operation of this apparatus.

In FIG. 9 there is illustrated the components which cause motor 11 to drive pump 12 in accordance with the time selected by dial 21. When follower finger 35 is riding on cable 17 in groove 37, the pawl assembly is in the position shown in FIG. 9 with pawl at 20a (dotted lines) and holding arm at 19a (dotted lines). In such a position spider 19 turns with motor shaft 38 but plate 14 and main shaft 13 is stationary with no pumping action from pump 12. When finger 35 descends to the bottom of groove 37 (where no cable 17 is present) holding arm 19 and pawl 20 are urged to the right by spring 42 in pawl housing 41 to engage hole 23 in plate 14 (as shown in solid lines), which, in turn, causes main shaft 13 to rotate and pump 12 to operate.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a feed rate control apparatus for a peristaltic pump including a main shaft, an index plate mounted on the main shaft, a spring biased pawl adapted to intermittently engage and disengage one of a plurality of holes in said plate as a follower moves over a variable cam surface, the improvement which comprises said index plate having a central D-shaped hole for slideable engagement with an end portion of said main shaft having a complemental D-shaped cross-section, said main shaft having a central portion of larger diameter than that of said end portion to form a shoulder at the junction of said end and central portions, said end portion at said shoulder having a slot substantially the width of said plate with its bottom surface at an angle of about 45° from the flat surface of said D-shaped cross-section of said end portion, the thickness of said main shaft measured along the diameter perpendicular to said flat side of said D-shaped cross-section being substantially equal to the thickness measured along the diameter perpendicular to the bottom surface of said slot.

2. The apparatus of claim 1 wherein said index plate is adapted to be locked onto said main shaft by inserting said main shaft end portion into said central D-shaped hole until said plate rests against said shoulder and rotating said plate with respect to said shaft 45° to seat said plate into said slot.

3. The apparatus of claim 1 further comprising a motor having a driving shaft engageable with said end portion of said main shaft and a peristaltic pump driven by the other end portion of said main shaft.

4. The apparatus of claim 3 wherein said peristaltic pump is slidingly attachable to said other end portion of said main shaft along the rotating axis of said pump.

5. The apparatus of claim 1 wherein said apparatus includes a housing with a bearing therein supporting the other end portion of said main shaft, a roller clutch mounted in said housing for supporting said central portion of said main shaft adjacent said end portion.

6. A feed rate control apparatus for a peristaltic pump for liquids comprising a main shaft having a central portion, and first and second end portions, said end portions being smaller in diameter than said central portion and being joined to said central portion by respective first and second shoulders, said first end portion having a longitudinal flat surface to provide a D-shaped cross section over its length and having adjoining said first shoulder a slot with a bottom flat surface angularly disposed with respect to said longitudinal flat surface, the maximum dimension from said bottom flat surface to the opposite side of said first end portion being substantially the same as the maximum dimension from said longitudinal flat surface to the opposite side of said first end portion; a generally planar circular index plate having a plurality of equally spaced holes in a circle adjacent the outside perimeter of said plate and having a central D-shaped hole complemental to said D-shaped cross-section of said first end portion, said plate being positioned in said slot with said first end portion through said D-shaped hole; a roller clutch surrounding said central portion adjacent said plate and a housing affixed to the outer surface of said clutch; and a pawl assembly freely rotatably mounted on said first end portion outside and adjacent to said index plate, said pawl assembly including a spider with a lateral arm having a passageway therethrough at a radial distance the same as that of said plurality of holes in said index plate, a pawl adapted to extend through said passageway and engage one of said holes in said index plate, a pawl holding arm having a free end supporting said pawl and having the other end attached to said spider, and spring means biasing said pawl toward engagement with one of said holes in said index plate.

7. The apparatus of claim 6 wherein said pawl holding arm includes a follower finger extending radially outwardly of said pawl and adapted to engage a circular groove.

8. The apparatus of claim 7 wherein said housing includes two concentric grooves the outer of which has the same radial dimension as that of said follower finger, said grooves being interconnected by a smoothly contoured groove located substantially opposite to that of said follower finger, said grooves being partially filled by an elongated flexible cable slideably movable lengthwise within said grooves and sufficiently long to extend approximately half way around said outer groove, through said interconnecting groove, and half way around said inner groove.

9. The apparatus of claim 8 which includes a dial ring adapted to be rotatably connected to the outside of said housing and to be affixed to one end of said cable.

10. The apparatus of claim 6 wherein said roller clutch is adapted to prevent any substantial amount of reverse rotation of said housing.

11. The apparatus of claim 6 further comprising a motor having a driving shaft and means for intermittently connecting said driving shaft to said main shaft through said pawl assembly.

12. A shaft for a feed rate control apparatus comprising a generally cylindrical shaft having a first end portion, a first central portion, a second central portion, and a second end portion all having a common longitudinal rotational axis, said first and second central portions having the same cylindrical surface and approximately the same axial length, said second central portion having a flat surface extending throughout its axial length so as to form a D-shaped cross-section, said second end portion being cylindrical over its entire surface with its radial dimension being substantially identical to the radial dimension of ssid second central portion measured from its flat surface, said first end portion being cylindrical and having a smaller radius than the radius of said first central portion, a shoulder joining said first central portion and said first end portion, said first end portion having a flat surface extending throughout its axial length to form a D-shaped cross-section, a slot adjacent said shoulder with a bottom flat surface at approximately 45° from said flat surface of said first end portion, the diametrical distance measured from said flat surface of said first end portion being substantially equal to the diametrical distance measured from said bottom flat surface of said slot.

* * * * *